United States Patent Office 3,429,208
Patented Feb. 25, 1969

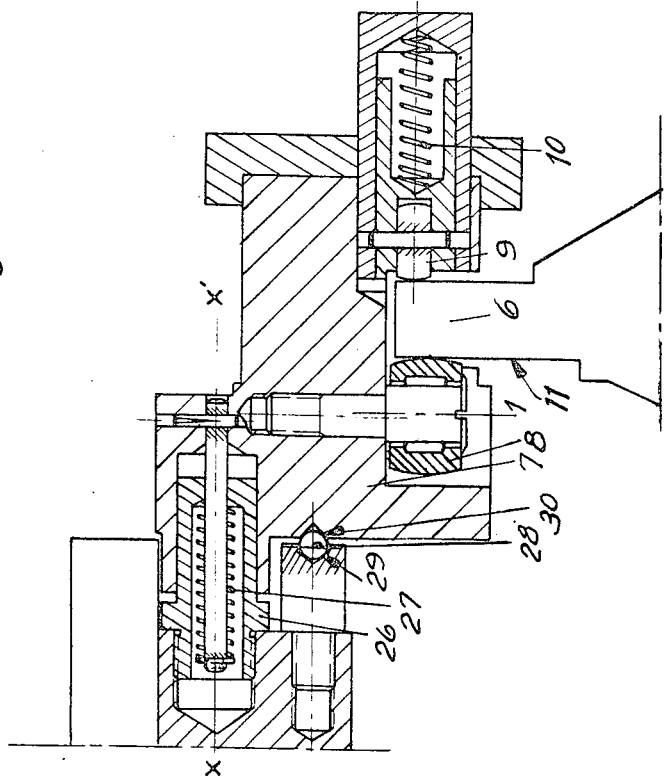
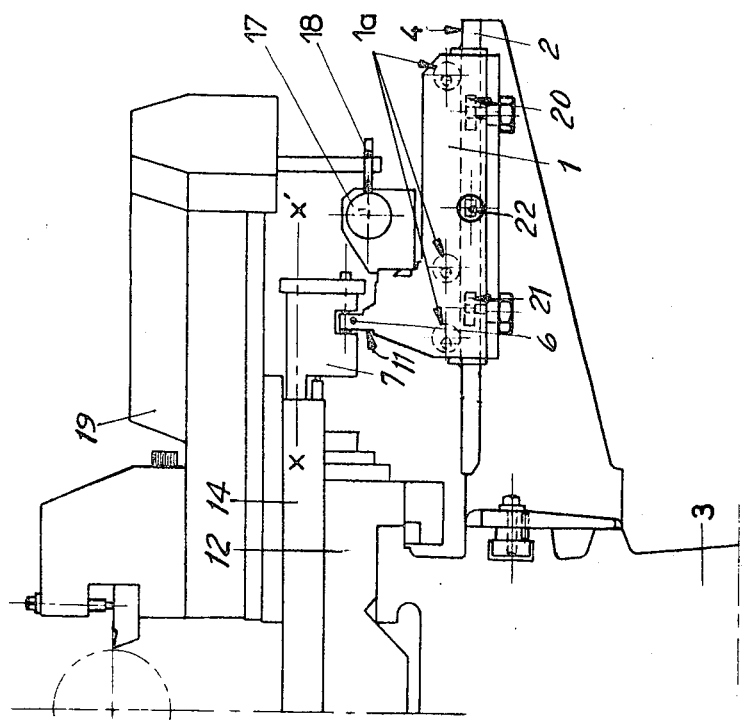

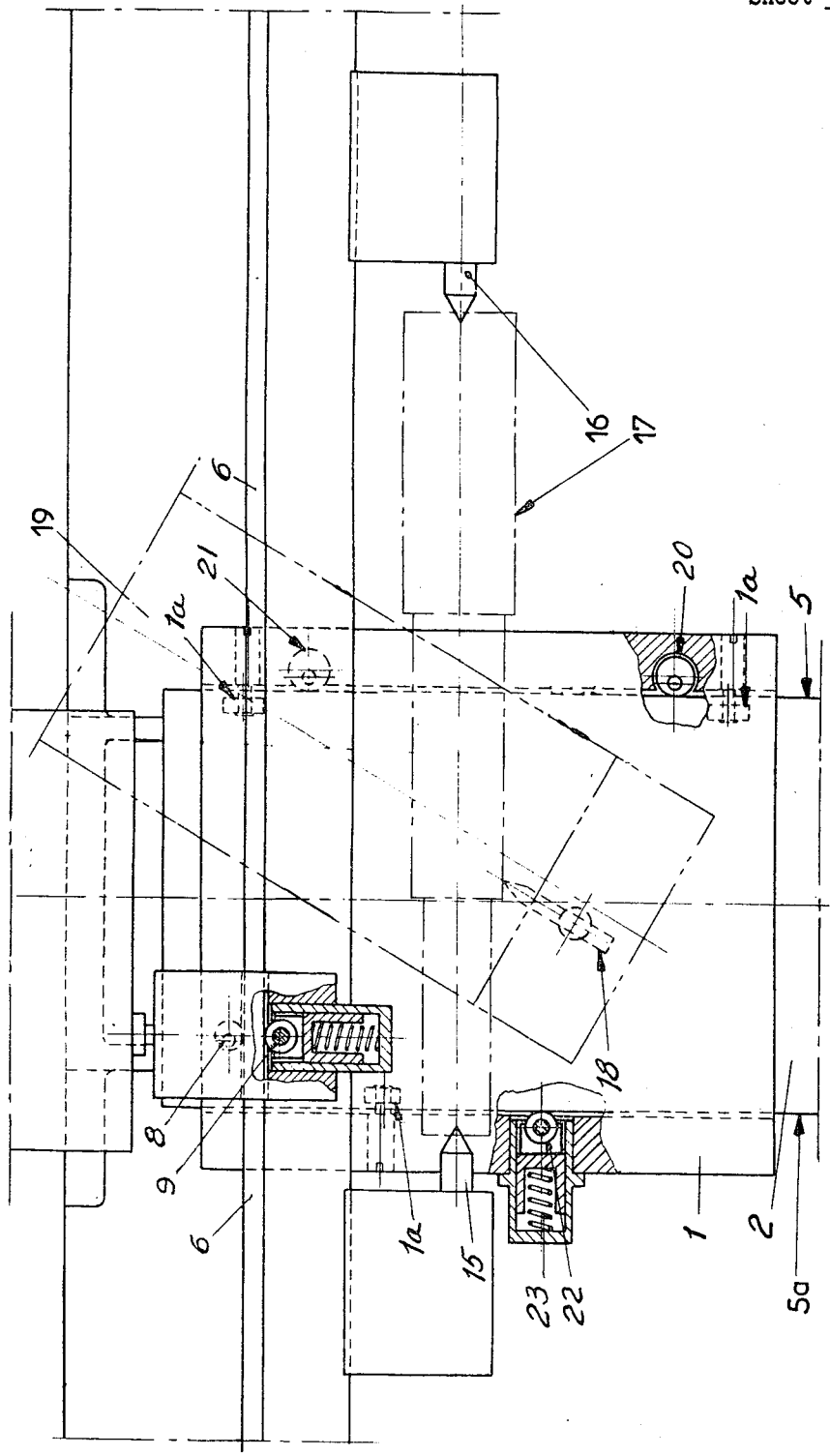

3,429,208
MOVABLE SUPPORTS FOR THE LONGITUDINAL MASTER IN COPYING DEVICES
Henri René Bruet, Paris, France, assignor of one-half to Etablissements A. Cazeneuve, La Plaine-Saint-Denis, Seine-Saint-Denis, France, a French company
Filed Sept. 16, 1966, Ser. No. 580,061
Claims priority, application France, Sept. 22, 1965, 32,195
U.S. Cl. 82—14                9 Claims
Int. Cl. B23b 3/28; B23a 35/00

ABSTRACT OF THE DISCLOSURE

A lathe wherein rollers engage and guide the carriages during operation to suppress all play during displacement of the carriages.

---

The present invention relates to improvements in movable supports for the longitudinal master in copying devices used in machine tools and more especially in engine lathes known as universal lathes.

Devices of this type are known in which displacements of the movable support are effected by the intermediary of adjustable rollers, rolling on planes machined as accurately as possible, but allowing tolerances of machining and of assembly which only permit an approximate adjustment of the rollers concerned, in order to avoid hard spots during operation. As a result of this, play will appear in certain positions of the system, which will give it an uncontrolled freedom which will spoil precise machining of the piece being worked and make a suitable finish impossible, requiring repetition of the piece in order to end within the tolerances required.

It is an object of the present invention to obviate these disadvantages, and to enable the achievement, without further reworking, of the work-piece with the necessary dimensions.

According to the invention, there is provided an improved movable support carriage for a longitudinal master in copying machines, in which the displacements of the movable support, bearing the master, are effected on a table mounted perpendicularly to the axis of the machine tool and parallel to the plane of travel of its cross-slide, wherein the sides of said table which serve as guides for said carriage bearing the master are gripped by table rollers and resilient means borne by the carriage on both sides of said support, which suppresses all play during the displacement of said carriage.

According to another feature of the invention, the support rail or bar integral with the carriage, on which are bolted the centre and tailstock for the master, is gripped resiliently by two bar rollers, which suppresses all play during operation, both for the transversal motion and for the longitudinal following, and makes the carriage orientable relative to the said support.

In order that the invention may be more clearly understood, a description follows of an embodiment according to the invention, given purely by way of non-limiting example of the application of the invention to a lathe, with reference to the accompanying drawings in which:

FIGURE 1 shows an elevation of an embodiment of the device;

FIGURE 2 shows the central portion of FIGURE 1 in detail;

FIGURE 3 shows the device in plan view.

Referring now to the drawings, in FIGURES 1, 2 and 3 are seen the carriage 1 which is displaced by means of the rollers 1a which roll on table 2, bolted in suitable position on the bed of the lathe 3. The plane 4 of this table is located with precision parallel to the axis of the lathe and to the plane of travel of the transverse carriage 14; its side is perpendicular to the axis of the lathe and parallel to the travel of the transverse carriage 14.

The carriage 1, which bears a support bar 6, preferably cast with it and machined at the same time, is guided on the table 2 by rollers 20 and 21 (adjustable by excentric or in any other manner), which can roll on the side 5 of the table 2 on which they are resiliently pressed, in constant and continuous fashion, by the roller 22, acting on the opposite side 5a of the said table 2, by a spring 23 of suitable force. This arrangement has the purpose of suppressing all play and avoiding all jamming during the rolling of the carriage 1 on the table 2.

The collet 7 grips the bar 6 which is held between the roller 8 and the roller 9 urged by the spring 10 (FIG. 2), so that all play is annuled in constant and continuous manner during the travel along the bar 6 of the collet 7 drawn by the carriage 12. On the bar 6, are placed the centre and tailstock 15, 16, or similar, intended to maintain the master 17 against which is urged the feeler 18 of the reproducer 19, which is of known type.

The bar 6 can be brought into a position strictly parallel to the travel of the carriage 12, by means of adjustable rollers 20 and 21 or of one of them.

The carriage 1 is coupled by the holder 7 to the transverse carriage 14 which can carry it along with it transversally, perpendicularly to the axis of the lathe. This collet 7 is articulated on the trunnion 26 and it is urged by a spring 27 against a ball 28, or similar member, which is also held between two seats, one 29 rigidly attached to the transverse carriage 14, the other 30 machined in the collet 7 which bears a second (not shown), angularly separated from the first 30, to permit, by rotation on the trunnion 26, the holder to be tilted and to be held in a new position where its rollers 8 and 9 leave the bar 6 thus freeing the carriage 1 in immediate manner and almost instantaneously with respect to the transversal 14. Members 27, 28, 29 and 30 provide self-locking means for the holder 7. The device being located according to the preceding description, the cut is carried out by the vernier of the transversal 14 (not shown). This has the effect of drawing, by means of the collet 7, the carriage 1 bearing the master 17, along the same distance, which permits the feeler 18 to travel, always under similar conditions, over the master 17, without any other operation when the main slide 12 draws the reproducer 19 longitudinally, in known manner. It will be noted that, due to the arrangement described, no play exists in as much as the rollers follow strictly the suitably oriented guide surfaces, as they are resiliently held with a suitable force and sufficient for rolling, with constant grip, on the surfaces concerned.

As a result the piece being machined can be rough-shaped and finished to the established tolerances, the precision depending only on that of the lathe employed. It will be possible to adjust the orientation of the bar 6 and to vary its position even during operation, by acting on the rollers 20 and 21, and even on only one, without risk of creating a momentary play harmful to good machining.

The bar 6 may be inclined with respect to the axis of the lathe, to all useful extents.

It is well understood that the present invention is not limited to the latter described embodiment, but that it encompasses all analogous or similar devices, and all devices which can comprise all or part of the devices given by way of non-limiting example. It comprises, moreover, all assemblies, machine tool or other, in which it can be incorporated.

What I claim is:

1. A copying machine tool, including a machine bed having a longitudinal axis, a saddle carried by said bed and movable longitudinally thereof, a transversal slide carried by said saddle to be drawn along by it longitudinally but capable of movement transversally thereto, a master carrying carriage, bracket means stationary provided on the bed and carrying said carriage, a guide way extended transversally of said longitudinal axis, guiding members in guiding engagement with said carriage, said guideway and guiding members being provided on said bracket of said carriage whereby the latter is guided transversally of the machine bed, a bar carried by said carriage to be movable therewith and extended transversally to the guideway, a coupling connection between the transversal slide and said bar such that the transversal slide will draw along with it the bar and the carriage transversally of the machine bed but will be movable longitudinally along said bar, resilient means disposed to act transversally of the guideway and thereby resiliently press together said guiding members and guideway whereby carriage and guideway are in transversally resilient guiding arrangement, and said coupling connection between the transversal slide and the bar being a pivotal connection allowing the bar to be adjustably set into a position parallel with or inclined to the longitudinal axis of the bed.

2. A machine as in claim 1, wherein the guideway comprises two guiding plane surfaces and each of said guiding members has a convex contact surface, said guiding engagement being afforded by engagement of said convex surfaces with said plane surfaces.

3. A copying machine as in claim 1, wherein said coupling connection comprises two oppositely situated rolling members carried by the slide and in rolling engagement with said bar on opposite sides thereof.

4. A copying machine as in claim 1, wherein the bed is unadjustably carried by the carriage and the latter is bodily adjustable transversely of the guideway thereby to adjust the position of the bar with respect to the latter.

5. A copying machine as in claim 3, wherein at least one of said rollers is resiliently pressed against said bar.

6. A copying machine as in claim 3, wherein one of said rolling members is resiliently pressed against the bar and adjusting means are associated with the other rolling member thereby to enable said latter rolling member to be adjustably moved slightly to and from said bar.

7. A copying machine as in claim 3, wherein said rolling members are carried by a supporting member pivoted to the slide so as to be pivotally movable to bring said rolling members into and out of engagement with the bar.

8. A copying machine as in claim 7, wherein the pivoting axis of said supporting member is substantially perpendicular to the longitudinal axis of the machine bed.

9. A copying machine as in claim 7, wherein the pivoting axis of said supporting member is perpendicular to the longitudinal axis of the machine bed, the pivoting connection of said supporting member to the slide provides for the supporting member to be slidable along said pivot axis and resilient means permanently urge said supporting means to slide into abuting engagement with the slide.

References Cited

UNITED STATES PATENTS 2,798,773  7/1957  Walter _____ 308—3

FOREIGN PATENTS 1,002,585  2/1957  Germany.
468,379    7/1937  Great Britain.

GERALD A. DOST, Primary Examiner.

U.S. Cl. X.R.

90—58; 308—6